United States Patent
Li et al.

(10) Patent No.: US 8,718,083 B2
(45) Date of Patent: May 6, 2014

(54) MECHANISM FOR CONTROLLING DATA TRANSMISSION IN FRAGMENTATION TRANSMISSION MODE

(75) Inventors: Wei Li, Oulu (FI); Jorma Lilleberg, Oulu (FI); Sami-Jukka Hakola, Kempele (FI); Samuli Turtinen, Li (FI); Timo Koskela, Oulu (FI); Anna Pantelidou, Oulu (FI)

(73) Assignee: Broadcom Corporation, Irvine, CA (US)

( * ) Notice: Subject to any disclaimer, the term of this patent is extended or adjusted under 35 U.S.C. 154(b) by 4 days.

(21) Appl. No.: 13/315,923

(22) Filed: Dec. 9, 2011

(65) Prior Publication Data

US 2013/0148640 A1    Jun. 13, 2013

(30) Foreign Application Priority Data

Dec. 8, 2011 (GB) .................................. 1121137.2

(51) Int. Cl.
*H04L 12/413* (2006.01)

(52) U.S. Cl.
USPC .......................................... 370/445; 370/329

(58) Field of Classification Search
USPC .................................. 370/329, 445
See application file for complete search history.

(56) References Cited

U.S. PATENT DOCUMENTS

| | | | |
|---|---|---|---|
| 7,827,459 B1 | 11/2010 | Zhou et al. | 714/749 |
| 2005/0238054 A1* | 10/2005 | Sharma | 370/473 |
| 2006/0153152 A1* | 7/2006 | Kondylis et al. | 370/338 |
| 2006/0156162 A1* | 7/2006 | Choi et al. | 714/748 |
| 2007/0049239 A1* | 3/2007 | Joung et al. | 455/343.1 |
| 2010/0275085 A1* | 10/2010 | Venkatachalam et al. | 714/748 |
| 2012/0239998 A1* | 9/2012 | Park et al. | 714/748 |

FOREIGN PATENT DOCUMENTS

| | | |
|---|---|---|
| TW | 2006/18540 A | 6/2006 |
| WO | WO 03/017691 A2 | 2/2003 |
| WO | WO 03/043259 A1 | 5/2003 |

* cited by examiner

*Primary Examiner* — Jason Mattis
(74) *Attorney, Agent, or Firm* — Stanton IP Law

(57) ABSTRACT

There is provided a mechanism for controlling a transmission of data in a fragmentation transmission mode. When fragments are transmitted in a fragmentation transmission mode, it is determined whether the fragment frame is received successfully or whether an acknowledgment message for confirming a successful transmission of the fragment frame is received. In case the acknowledgment for the successful transmission of the one fragment frame is not received, or the fragment is frame is not successfully received, the fragmentation transmission mode is maintained and a retransmission of the fragment frame is initiated.

18 Claims, 11 Drawing Sheets

MECHANISM FOR CONTROLLING DATA TRANSMISSION IN FRAGMENTATION TRANSMISSION MODE

BACKGROUND OF THE INVENTION

1. Field of the Invention

The present invention relates to a mechanism for controlling a transmission of data in a fragmentation transmission mode where plural data fragments or data frames are transmitted consecutively between a source station and a destination station. Specifically, the present invention is related to an apparatus, a method and a computer program product which provide the necessary means for an improved mechanism for controlling a data transmission in a communication network, such as a wireless local are network, when a fragmented transmission of data is employed.

2. Related Background Art

Prior art which is related to this technical field can e.g. be found in technical specifications related to IEEE 802.11 standard for WLAN networks.

The following meanings for the abbreviations used in this specification apply:
ACK acknowledgement
CCA clear channel assessment
CRC cyclic redundancy check
CTS clear to send
DIFS distributed interframe space
DST destination station
HDR header
MAC medium access control
MPDU MAC protocol data unit
MSDU MAC service data unit
NAV net allocation vector
PIFS point interframe space
PLCP physical layer convergence protocol
PPDU PLCP protocol data unit
RTS ready to send
SIFS short interframe space
SNR signal-to-noise ratio
STA station
SRC source station
WLAN wireless local area network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Especially in wireless communication networks, such as for example a WLAN based on IEEE 802.11 standards or comparable network types, in order to obtain a good communication quality, it is required to combat with imperfect wireless channel, e.g. a low signal-to-noise ratio (SNR) or strong neighboring interference, and to reduce overhead of retransmission. One approach used in this connection is a fragmentation transmission scheme. The idea of using fragmentation is to divide a large data packet e.g. in the form of a MSDU into several smaller consecutive packets or frames, such as MAC level frames (MPDUs). The effect of this division or fragmentation is that if the channel quality during the transmission time of one or a few number of the (separated) fragments is not sufficient, this will not destroy the whole MSDU transmission. That is, if retransmission of one or more fragments is required, the source station only needs to transmit those portions of the MSDU instead of the whole MSDU.

For example, a 1500 byte data frame sent using the 1 Mbps 802.11b rate takes 12 ms to transmit, making it susceptible to changing channel conditions. A bit error in the frame would result in the entire frame being retransmitted. When using a fragmentation transmission scheme, the MSDU is broken into smaller sections and each section may be encapsulated in an MPDU. Each MPDU may be sent in a separate PLCP PDU (PPDU) with the preamble of each PPDU providing a new channel estimate. A bit error would result in only the MPDU carrying the erroneous segment being retransmitted.

It should be noticed that using fragmentation mode also introduces the extra overhead due to a necessary security distance between transmissions of frames, such as an additional SIFS time interval, and the frame header of each fragment. However, when the channel condition is poor, the fragmentation mode may still be able to get more benefit from the retransmission reduction than the cost due to those extra overhead. On the other hand, when the channel condition is good, the fragmentation mode may be deactivated.

In the following, channel conditions or settings such that a fragmentation transmission mode is set are assumed.

SUMMARY OF THE INVENTION

It is an object of the invention to provide an improved mechanism for controlling a data transmission using a fragmentation transmission mode in a communication network. Specifically, it is an object of the present invention to provide a mechanism by means of which a consecutive transmission of plural data frames or fragment frames between a source station and a destination station can be enhanced and thus the transmission performance in a communication network using a fragmentation transmission scheme, such as a WLAN or another wireless communication network, can be improved.

This object is achieved by the measures defined in the attached claims.

According to an example of an embodiment of the proposed solution, there is provided, for example, an apparatus comprising a transmitter configured to transmit, in a fragmentation transmission mode, a set of data being divided in a plurality of fragment frames, wherein the fragment frames are transmitted in a consecutive order, a receiver configured to receive an acknowledgment message for confirming a successful transmission of the data frames, a determiner configured to determine whether or not an acknowledgment message for confirming the successful transmission of one fragment frame is received before the next fragment frame is transmitted or before the transmission is completed, and a retransmission processing portion configured, in case the determiner determines that the acknowledgment for the successful transmission of the one fragment frame is not received, to maintain the fragmentation transmission mode and to initiate a retransmission of the fragment frame corresponding to that for which the acknowledgement of the successful transmission is not received.

Furthermore, according to an example of an embodiment of the proposed solution, there is provided, for example, a method comprising transmitting, in a fragmentation transmission mode, a set of data being divided in a plurality of fragment frames, wherein the fragment frames are transmitted in a consecutive order, determining whether or not an acknowledgment message for confirming a successful transmission of one fragment frame is received before the next fragment frame is transmitted or before the transmission is completed, and in case it is determined that the acknowledgment for the successful transmission of the one fragment frame is not received, maintaining the fragmentation transmission mode and initiating a retransmission of the fragment frame corresponding to that for which the acknowledgement of the successful transmission is not received.

In addition, according to an example of an embodiment of the proposed solution, there is provided, for example, an apparatus comprising a receiver configured to receive, in a fragmentation transmission mode, a set of data being divided in a plurality of fragment frames, wherein the fragment frames are received in a consecutive order, a transmitter configured to transmit an acknowledgment message for confirming a successful transmission of the data frames, a receipt determiner configured to determine whether or not a current fragment frame is successfully transmitted and received, and a retransmission requesting portion configured, in case the receipt determiner determines that the fragment frame is not successfully received, to send a request for retransmission of the fragment frame which is not successfully transmitted and received, wherein the request for retransmission comprises an indication to maintain the fragmentation transmission mode, and to reserve transmission resources for the retransmission of the fragment frame By virtue of the proposed solutions, it is possible to provide a mechanism by means of which a consecutive transmission of plural data frames or fragment frames between a source station and a destination station is enhanced and the transmission performance in a fragmentation transmission scheme is improved. For example, it is possible to quickly resume a fragment transmission, for example in case of a failure in receiving a fragment frame, without the requirement to establish a new connection, i.e. without the necessity to go back to a connection initialization state such as a channel contention stage. Furthermore, the transmission performance of the fragmentation transmission mode can be improved and it is possible to satisfy the requirement of a maximum life time setup. Moreover, examples of embodiments of the invention can be easily be implemented in wireless communication network systems since it is possible to use existing messaging mechanisms and frame formats for data transmission.

In addition, by means of examples of embodiments of the invention, a retransmission of a fragment frame which is not successfully received at the destination station, e.g. due to improper communication conditions or the like, can be effected in an efficient manner since a long retransmission waiting time due to channel contention latency (backoff window may be doubled) can be avoided. Hence, the source station is not required to spend a longer time to start up the re-transmission than the expiration time of a higher layer timer. Thus, it can be avoided that the data packet to be transmitted, such as a MSDU, is discarded, so that the transmission efficiency is enhanced.

The above and still further objects, features and advantages of the invention will become more apparent upon referring to the description and the accompanying drawings.

DESCRIPTION OF PREFERRED EMBODIMENTS

Figure 1:
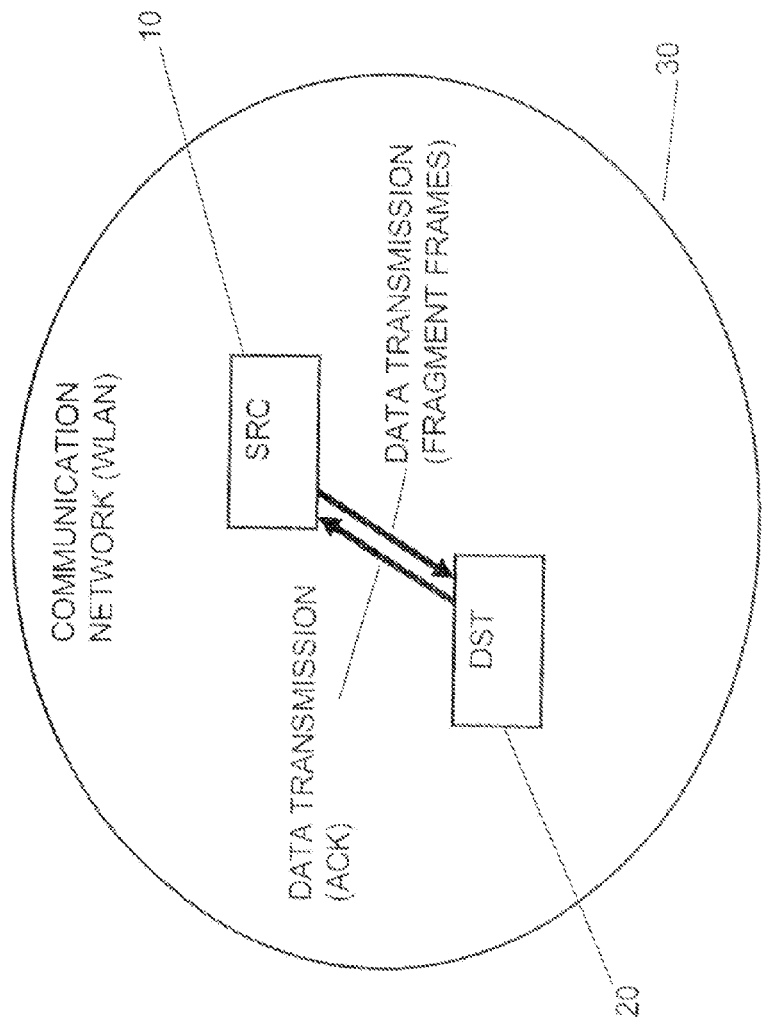
FIG. 1 shows a diagram illustrating a communication network configuration in which examples of embodiments of the invention are implementable.

In the following, examples and embodiments of the present invention are described with reference to the drawings. For illustrating the present invention, the examples and embodiments will be described in connection with wireless communication network based on WLAN according to IEEE 802.11 standard. However, it is to be noted that the present invention is not limited to an application using such a type of communication system or network, but is also applicable in other types of communication systems and the like where a fragmentation transmission scheme is applied.

A basic system architecture of a communication network may comprise a commonly known architecture of a communication system comprising a sender or source station and a receiver or destination station. In addition to the source and destination stations, further elements such as wired or wireless access network subsystem and a core network may be part of the communication system architecture. Such an architecture may comprise one or more network element such as routers, access network control elements, radio access network elements, access service network gateways or base transceiver stations, e.g. base stations, with which a host network element or device, such as a user equipment or another device having a similar function, such as a modem chipset, a chip, a module etc., which can also be part of a user equipment or attached as a separate element to a user equipment, or the like, is capable to communicate via one or more channels for transmitting several types of data.

The general functions and interconnections of the described elements, depending on the actual network type, are known to those skilled in the art and described in corresponding specifications so that a detailed description thereof is omitted herein. However, it is to be noted that several additional network elements and signaling links may be employed for a communication connection between the source and destination stations or network nodes, besides those described in detail herein below.

Furthermore, the described network elements, such as a source station or a destination station, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

FIG. 1 shows a diagram illustrating a communication network configuration in which examples of embodiments of the invention are implementable. In the diagram illustrated in FIG. 1, a source station SRC 10 and a destination station DST 20, for example routers, devices, user equipments etc., are located in a communication area of a WLAN (i.e. one or both of the devices 10, 20 form a WLAN communication network, for example). As indicated by the arrows, the SRC 10 transmits data e.g. in the form of consecutive packets or frames (i.e. in a fragmentation transmission mode) to the DST 20, which usually sends acknowledgments to the SRC 10 when a respective frame is successfully received. It is to be noted that in a usual WLAN configuration a physical device being used as a SRC is also used as a DST, and vice versa, so that the functions and means described in the following may be implemented in both of the elements 10, 20 shown in FIG. 1.

Figure 2:
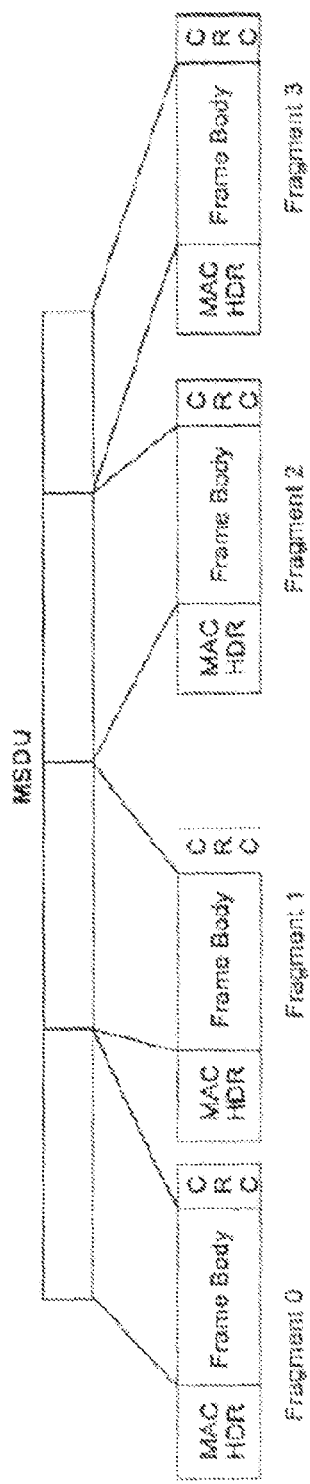
FIG. 2 shows a diagram illustrating the principle of fragmentation in a fragmentation transmission mode.

FIG. 2 shows a diagram illustrating the principle of fragmentation in a fragmentation transmission mode. According to FIG. 2, a data packet which is to be transmitted from a source to a destination is indicated as a MSDU. Each MSDU may be associated to a higher layer timer, which defines a maximum lifetime of the packet. When the timer expires, this MSDU is invalid and discarded. Hence, for a MSDU packet larger than the size of the MAC level frame being able to be reliably transmitted, the SRC 10 (the WLAN system) divides the (large) MSDU into several MAC level frames, which are also referred to as fragments 1 to 4 or fragment frames. Each fragment comprises a MAC header HDR, a frame body with the data to be transmitted, and a CRC field for checking correct transmission.

The fragment frames may be transmitted to the destination STA as soon as possible via the fragmentation transmission mode so as to avoid the multiple channel contention procedures.

In the fragmentation transmission mode, the SRC 10 starts the transmission after it seizes a channel, i.e. after reserving transmission resources for the fragment frame transmission. To continuously use the reserved channel, the SRC 10 and the DST 20 transmit the fragment frames and corresponding ACK information alternatively after a corresponding safety interval which is referred to as SIFS time interval (e.g. 10 μs).

Generally, the fragmentation transmission procedure is completed when all fragments are transmitted, whereupon the stations enter again a channel contention stage or the like. However, conventionally, when e.g. one ACK information is lost, i.e. the successful transmission is not confirmed, the stations may also enter the channel contention stage. Thus, in the latter case, the fragment transmission has to be stopped because either the DST does not receive the fragment or the SRC does not receive the ACK.

Therefore, according to examples of embodiments of the invention, both STAs, i.e. the SRC and the DST are controlled such that the fragment transmission mode is maintained or resumed, instead of ceasing the transmission and releasing the channel, i.e. entering the channel congestion stage, so that e.g. the long retransmission waiting time due to the channel contention, where the backoff window is doubled, can be avoided.

First, for illustrating the configuration and effects of the examples of embodiments of the invention, comparative examples are illustrated in connection with FIGS. 9 to 11 where a control mechanism based on an approach being different to that of examples of embodiments of the invention is used.

Figure 9:
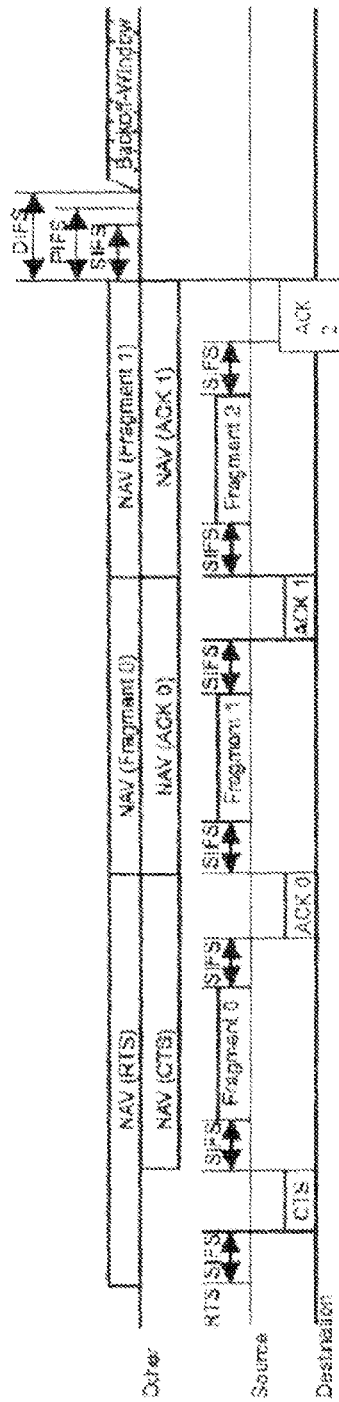
FIG. 9 shows a diagram illustrating a comparative example of a data transmission scheme.

FIG. 9 shows a diagram illustrating a first comparative example of a data transmission scheme. In this comparative example, a data transmission between a source station and a destination station by using a fragmentation transmission mode with RTS/CTS signaling is assumed. In the figure, the uppermost line indicates the reservation of channel by means of NAVs so that other stations know that the respective resource is blocked or seized. The line in the middle labeled by "Source" indicates the transmission processing in the source station, i.e. mainly the respective waiting times caused e.g. by SIFS and the fragment transmission phases. In the lowest line labeled by "Destination", the transmission processing in the destination station is indicated, i.e. mainly the transmissions of ACKs following to the receipt of a respective fragment.

The fragmentation transmission according to the comparative example may be done as follows.

The source station sends a RTS to the destination STA after it seizes the channel (by means of NAV (RTS)). In the RTS, the source station reserves the channel until the first expected ACK (i.e. the ACK0 for the first fragment 0). The destination station replies a CTS to the source station if it receives the RTS successfully. Otherwise, it keeps silent (i.e. no connection is established). In the CTS message, the destination station reserves also the channel until the first expected ACK (by NAV (CTS)). If the source station receives the CTS successfully, it transmits the (first) fragment to the destination station, after waiting one SIFS time period. Otherwise, it enters the channel contention stage to send another RTS.

It is to be noted that in case the first fragment is the only fragment, the source station reserves the channel until the expected incoming ACK (ACK 0). Otherwise, in case there are more fragments, it reserves the channel until the next expected ACK (i.e. ACK 1 for the second fragment).

In case the destination station receives the fragment transmitted in this phase (here, fragment 0), it replies an ACK to the source station after one SIFS time period. If there is no further fragment to be transmitted (i.e. in case the received fragment is the only fragment or the last fragment in the consecutive order to fragment frames formed e.g. according to FIG. 2), the destination station does not further reserve the channel. Otherwise, it reserves the channel until the next expected ACK (i.e. ACK 1).

According to the comparative example, when the destination station does not received the fragment frame (fragment 0) correctly, it quits the fragmentation transmission mode and keeps silent.

If the source station receives the ACK for the current fragment frame successfully and there are no more fragment to be sent, it quits the fragmentation transmission mode. Otherwise, in case further fragments are present, it continues sending the fragment frames according to the respective fragment number within the ACK information, i.e. according to the in the consecutive order. Then, it reserves again the channel until the expected incoming or next ACK, again depending whether this fragment is the last fragment or not.

According to the comparative example, if the source station does not receive a correct ACK, it quits the current fragmentation transmission mode and enters the channel content stage to initialize another transmission.

The source and destination stations repeat these procedures until all fragments are sent or one of them quits the transmission. That is, in FIG. 9 an example of the successful transmission in the fragmentation transmission mode is shown where all fragments (here fragments 0 to 2) are successfully sent and the respective ACKs (ACK0, ACK1, ACK2) are received. Thereafter, the fragmentation transmission mode is quit and, after waiting a corresponding safety time period (SIFS, PIFS, DIFS, corresponding to the priority), and a backoff window time, the stations enter again the channel contention stage.

Figure 10:
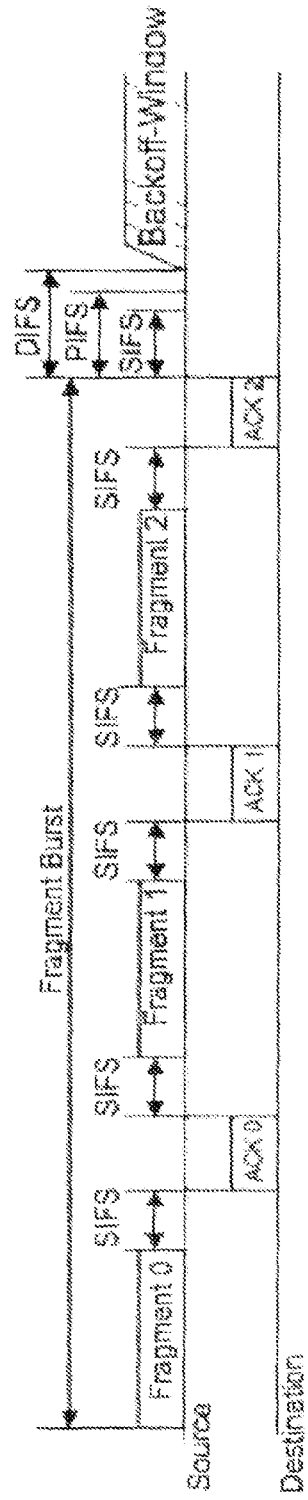
FIG. 10 shows a diagram illustrating a further comparative example of a data transmission scheme.

FIG. 10 shows a diagram illustrating a further comparative example of a data transmission scheme. Specifically, FIG. 10 is related to a transmission mode where the fragmentation transmission mode is executed without RTS/CTS.

In FIG. 10, which shows also a successful transmission in the fragmentation transmission mode, the source and destination stations use a similar procedure to that described in connection with FIG. 9, wherein only the RTX/CTS signaling is omitted. Hence, a detailed description of FIG. 10 is omitted FIG. 11 shows a diagram illustrating a comparative example of a data transmission scheme when a failure occurs. Specifically, FIG. 11 is related to a case which is based on the same principle as FIG. 9 but where a failure occurs in the form of an ACK message being lost.

Figure 11:
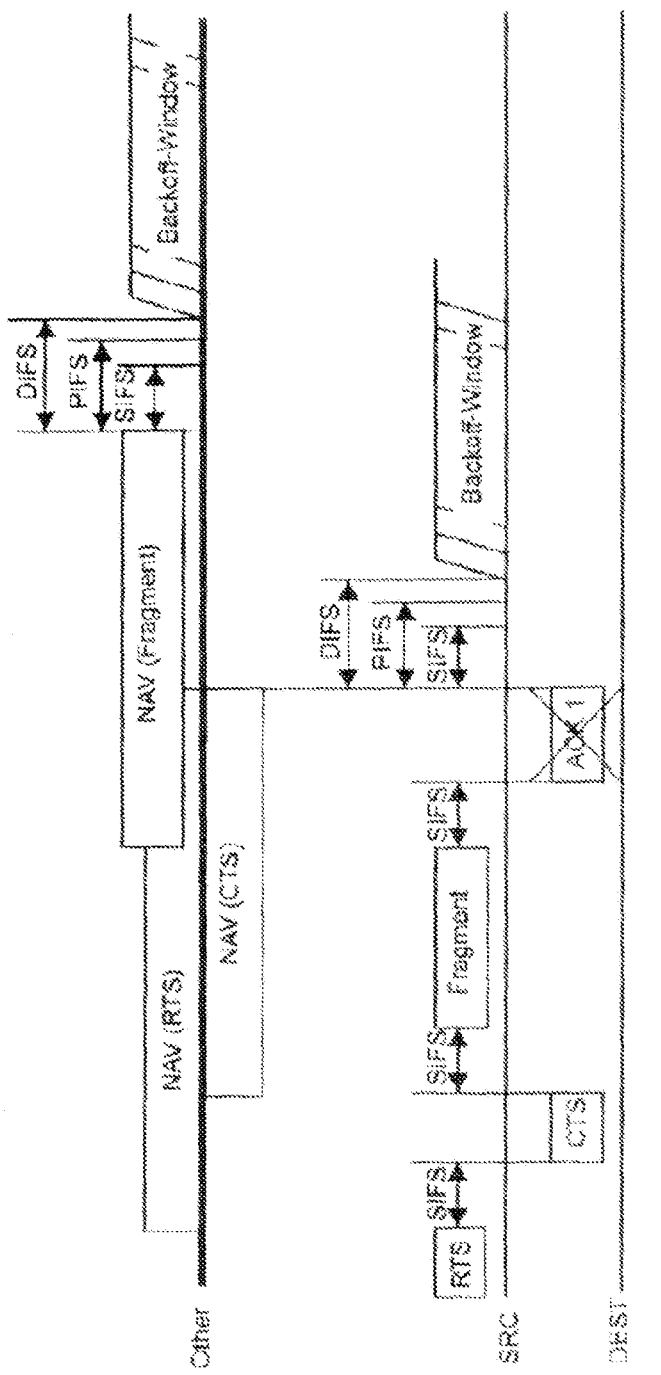
FIG. 11 shows a diagram illustrating a comparative example of a data transmission scheme when a failure occurs.

As the source station, as indicated above, has to always go back to the channel contention procedure and re-transmit the remaining fragments of the MSDU packet after it again seizes the channel, when one ACK is not received by the source station, a long time is required for performing the retransmission since due to the channel contention latency, the source station spends longer time to start up the re-transmission than the expiration time of the higher layer timer (see upper and middle lines in FIG. 11). As a result, the whole MSDU may be discarded.

Therefore, as indicated above, according to examples of embodiments of the invention, a control scheme is implemented where both STAs, i.e. the SRC and the DST are controlled such that the fragment transmission mode is maintained or resumed, instead of ceasing the transmission and releasing the channel, i.e. entering the channel congestion stage, when a failure occurs.

Figure 3:
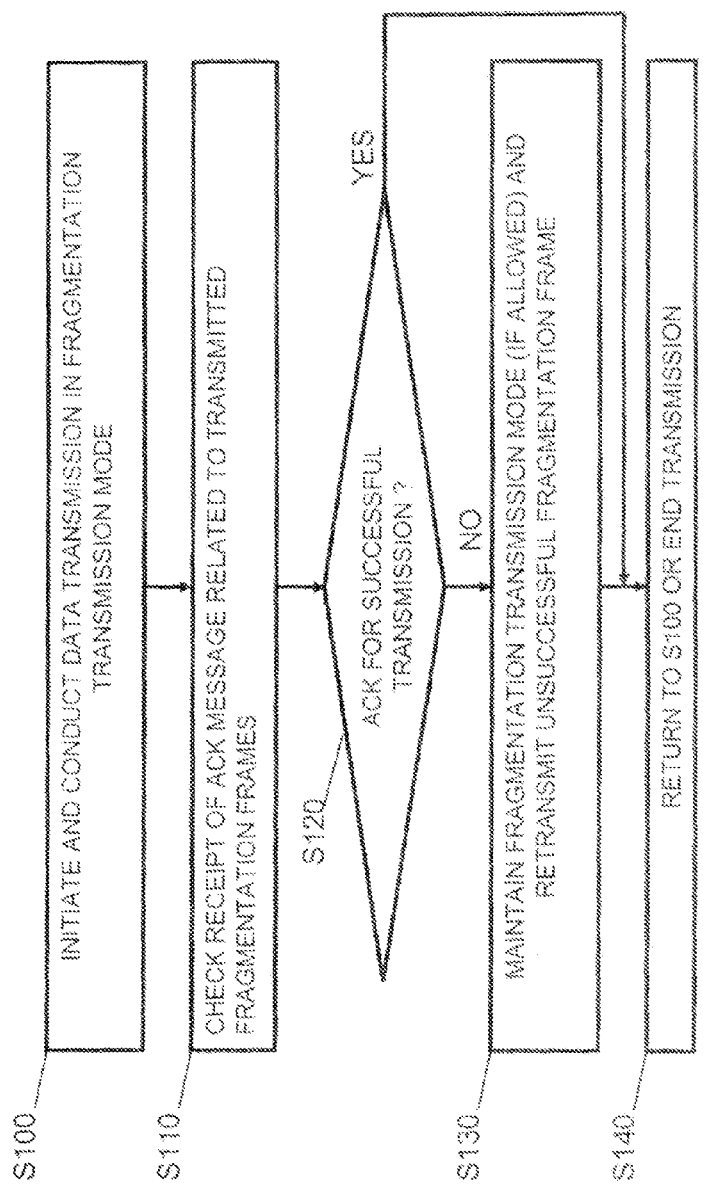
FIG. 3 shows a flowchart illustrating a control processing executed in a source station according to examples of embodiments of the invention.

FIG. 3 shows a flowchart illustrating a control processing executed in a source station according to examples of embodiments of the invention.

Generally, according to examples of embodiments of the invention, when conducting a transmission of fragment frames in the fragmentation transmission mode, i.e. start a transmission of fragment frames or continues the transmission after a preceding transmission (step S100), it is checked or determined in step S110 whether or not an ACK message for confirming a successful transmission of the current fragment frame is received, before the next fragment frame is transmitted or before the transmission is completed.

For example, it may be checked in step S110 whether or not a corresponding ACK message is received within a predetermined period of time after the transmission of the current fragment frame, or whether an indication (e.g. in the form of an ACK message for the preceding fragment frame) to start a retransmission of a fragment frame which is not successfully transmitted is received.

In step S120, based on the determination in step S110, it is decided whether the ACK for successful transmission of the current fragment frame is present. If yes, the usual processing for continuing the fragmentation transmission mode is executed, i.e. the next fragment is sent etc. so that the procedure can be finally completed in step S140.

Otherwise, if the ACK is not received or another ACK as request for retransmission is received (NO in step S120), in step S130, the fragmentation transmission mode is maintained or resumed and retransmission of the fragment frame corresponding to that for which the ACK of the successful transmission is not received is initiated.

Thereafter, step S140 follows where the procedure returns to step S100.

According to an example of an embodiment of the invention, a further detection step is included in the procedure, for example in connection with step S110 or S130, in which it is detected whether or not at least one further fragment frame exists in the consecutive order after the one fragment frame for which the acknowledgment for the successful transmission is not received. In other words, it is checked whether the unsuccessfully transmitted fragment was the last (or only) fragment of the MSDU. If this is the case, retransmission of the fragment frame is prohibited, and the station is controlled to enter the channel congestion stage. Otherwise, if it is determined that at least one further fragment frame is present, the fragmentation transmission mode is maintained and the retransmission of the fragment frame corresponding to that for which the acknowledgement of the successful transmission is not received is initiated.

According to a further example of an embodiment, a retransmission counter is provided which determines whether a number of retransmission attempts being initiated by the SRC reaches a preset maximum number. This determination may be part of, for example, step S130. If the maximum number is reached, the initiation of retransmitting the fragment frame is prohibited. Otherwise, the next retransmission attempt is allowed. The maximum number may be set adaptively, for example in accordance with a function based on a prevailing communication network state like communication load or the like (the higher the load the smaller the maximum number set, for example).

According to a further example of an embodiment, means for distinguishing a receiving status of information on the basis of which it is determined whether or not the ACK message for confirming the successful transmission of one fragment frame is received, into a first status (no ACK message is received) and a second status (incomplete ACK message or different ACK message for indicating start of the retransmission) are provided. In case of the first status, the SRC may keep silence, i.e. stop retransmission of the fragment frame. In the second status, a retransmission of the fragment frame is allowed.

It is to be noted that according to examples of embodiments, an indication may be sent to the destination station allowing to determine that at least one further fragment frame in the consecutive order will follow (i.e. that the current frame is not the last or only frame).

Figure 4:
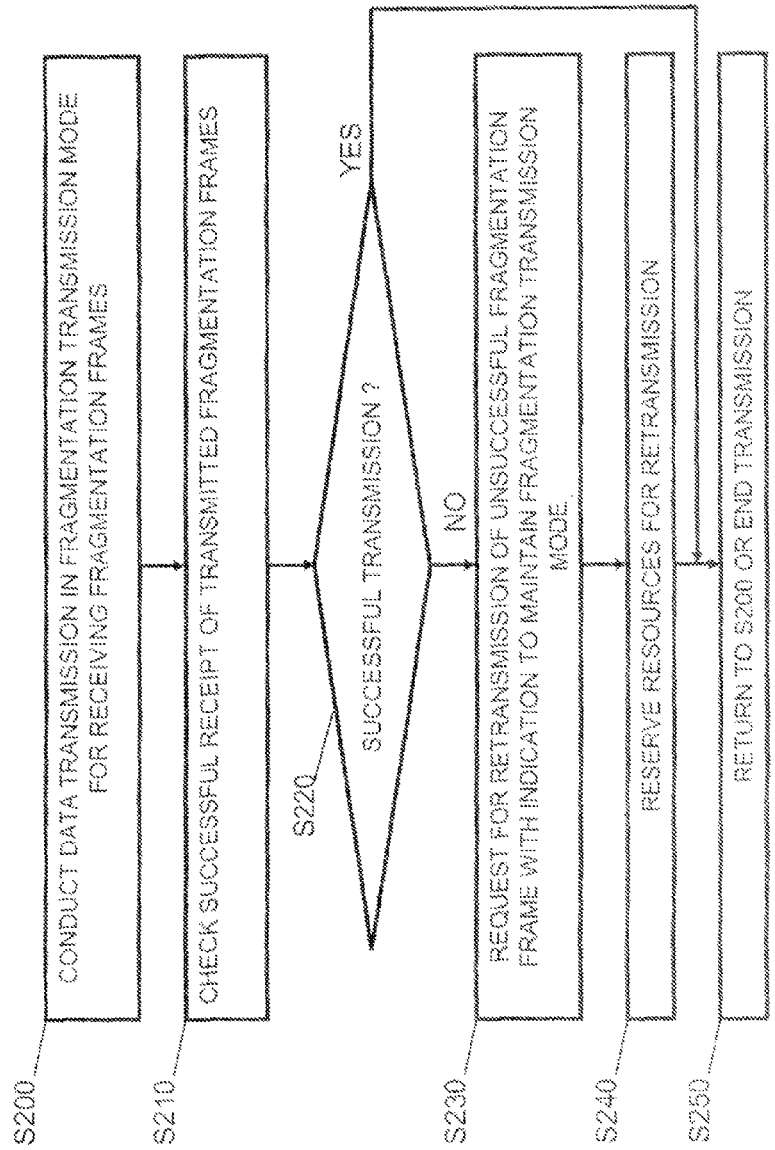
FIG. 4 shows a flowchart illustrating a control processing executed in a destination station according to examples of embodiments of the invention.

FIG. 4 shows a flowchart illustrating a control processing executed in a destination station according to examples of embodiments of the invention.

Generally, according to examples of embodiments of the invention, when conducting a transmission of fragment frames in the fragmentation transmission mode, i.e. a transmission of a fragment frame is received (step S200), it is checked or determined in step S210 whether or not the current fragment frame is successfully received.

For example, it may be checked in step S210 whether or not a correct fragment frame is received within a predetermined period of time after the transmission of the preceding ACK message, and/or whether a CRC or like is correct.

In step S220, based on the determination in step S210, it is decided whether the current fragment frame is successfully received. If yes, the usual processing for continuing the fragmentation transmission mode is executed, i.e. the ACK message is sent etc. so that the procedure can be finally completed in step S250.

Otherwise, if the fragment frame is decided to be not correctly received in step S220, according to step S230, a request for retransmission is prepared and sent to the source station. For example, a preceding ACK message for sent for the preceding fragment frame is sent as request for retransmission and for maintaining the fragmentation transmission mode to that a retransmission of the unsuccessfully transmitted fragment frame is initiated.

Furthermore, in step S240, resources for the retransmission are reserved. That is, since an ACK for a preceding fragment, i.e. with an older fragment number, is sent to the source station, a NAV field or the like for seizing the channel may be set to a same value like that used beforehand, and the channel is thus reserved.

Thereafter, step S250 follows where the procedure returns to step S200.

According to an example of an embodiment of the invention, a further detection step is included in the procedure, for example in connection with step S210 or S230, in which it is detected whether or not at least one further fragment frame exists in the consecutive order after the one fragment frame for which the acknowledgment for the successful transmission is not received. In other words, it is checked whether the unsuccessfully transmitted fragment was the last (or only) fragment of the MSDU. If this is the case, request of retransmission of the fragment frame is prohibited, and also no reservation of resources is done. Otherwise, if it is determined that at least one further fragment frame remains, the retransmission of the unsuccessful fragment frame is allowed and resources are reserved.

According to a further example of an embodiment, a retransmission counter is provided which determines whether a number of retransmission attempts, i.e. requests for retransmissions being initiated by the DST reaches a preset maximum number. This determination may be part of, for example, step S230. If the maximum number is reached, the request for retransmitting the fragment frame and the reservation of resources are prohibited. Otherwise, the next attempt for requesting retransmission is allowed. The maximum number may be set adaptively, for example in accordance with a function based on a prevailing communication network state like communication load or the like (the higher the load the smaller the maximum number set, for example).

According to a further example of an embodiment, means for distinguishing a receiving status of information on the basis of which it is determined whether or not fragment frame is not successfully received, into a first status (no fragment is received) and a second status (incomplete fragment) are provided. In case of the first status, the DST may keep silence, i.e. stop requesting of retransmission of the fragment frame by sending a corresponding indication. In the second status, request of retransmission of the fragment frame is allowed.

It is to be noted that according to examples of embodiments, an indication may be received from the source station allowing to determine that at least one further fragment frame in the consecutive order will follow (i.e. that the current frame is not the last or only frame).

Figure 5:
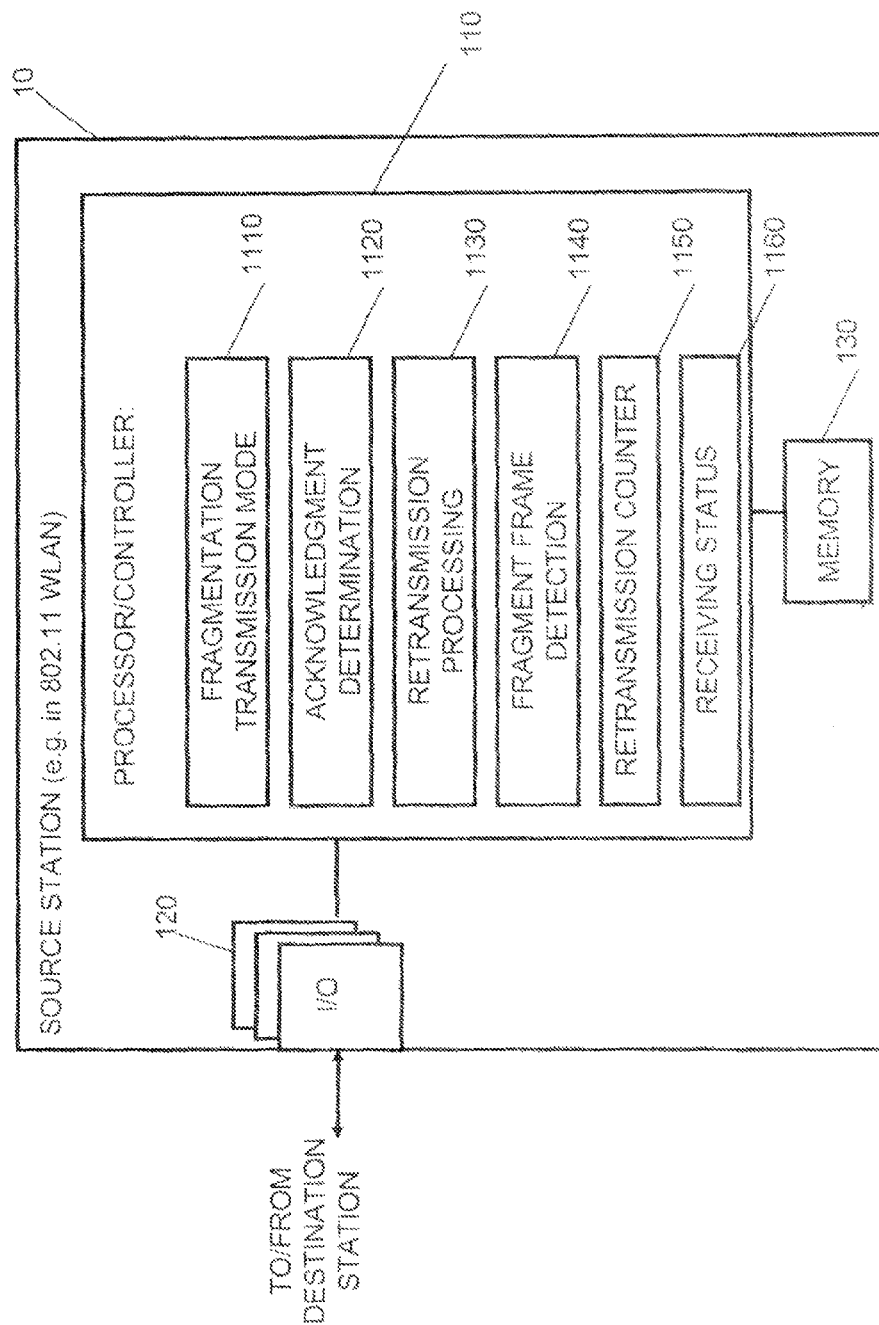
FIG. 5 shows a block circuit diagram of a source station including processing portions conducting functions according to examples of embodiments of the invention.

FIG. 5 shows a block circuit diagram of a source station including processing portions conducting functions according to examples of embodiments of the invention. Specifically, in FIG. 5, a block circuit diagram illustrating a configuration of source station such as network node or device according to a IEEE 802.11 based WLAN device is shown, which is configured to implement functions for a processing as described in connection with the examples of embodiments of the invention according to FIG. 3.

It is to be noted that the source station shown in FIG. 5 may comprise several further elements or functions besides those described herein below, which are omitted herein for the sake of simplicity as they are not essential for understanding the invention. Furthermore, even though reference is made to a network node or the like, the source station may be also another device having a similar function, such as a modem chipset, a chip, a module etc., which can also be part of a communication network element or attached as a separate element to a communication network element, or the like. Moreover, it is to be noted that a network element according to examples of embodiments of the invention does not need to comprise all of the processing portions described below, as long as the main functionality regarding the transmission control in fragmentation transmission mode as described above can be executed.

The source station 10 may comprise a processing function or processor 110, such as a CPU or the like, which executes instructions given by programs or the like related the transmission control. The processor 110 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 120 denotes interface or transceiver or input/output (I/O) units connected to the processor 110. The I/O units 120 may be used for communicating with elements of the communication network, such as a destination station. The I/O units 120 may be a combined unit comprising communication equipment towards several network elements, or may comprise a distributed structure with a plurality of different interfaces for different network elements. Reference sign 130 denotes a memory usable, for example, for storing data and programs to be executed by the processor 110 and/or as a working storage of the processor 110.

The processor 110 is configured to execute processing related to the above described transmission control mechanism. In particular, the processor 110 comprises a sub-portion 1110 as a processing portion which is usable as a controller for the fragmentation transmission mode. Furthermore, the processor 110 comprises a sub-portion 1120 as a processing portion which is usable for determining whether a correct ACK message is received. Furthermore, the processor 110 may comprise a sub-portion 1130 as a processing portion which is usable for controlling the retransmission process of the unsuccessfully transmitted fragment frame. Moreover, the processor 110 may comprise a sub-portion 1140 as a processing portion which is usable for detecting whether the fragment frame in question is the last (only) frame of the transmission. In addition, the processor 110 may comprise a sub-portion 1150 as a processing portion which is usable as a retransmission counter. Furthermore, the processor 110 may comprise a sub-portion 1160 as a processing portion which is usable for distinguishing the receiving status of information, i.e. the above defined first status and second status.

Figure 6:
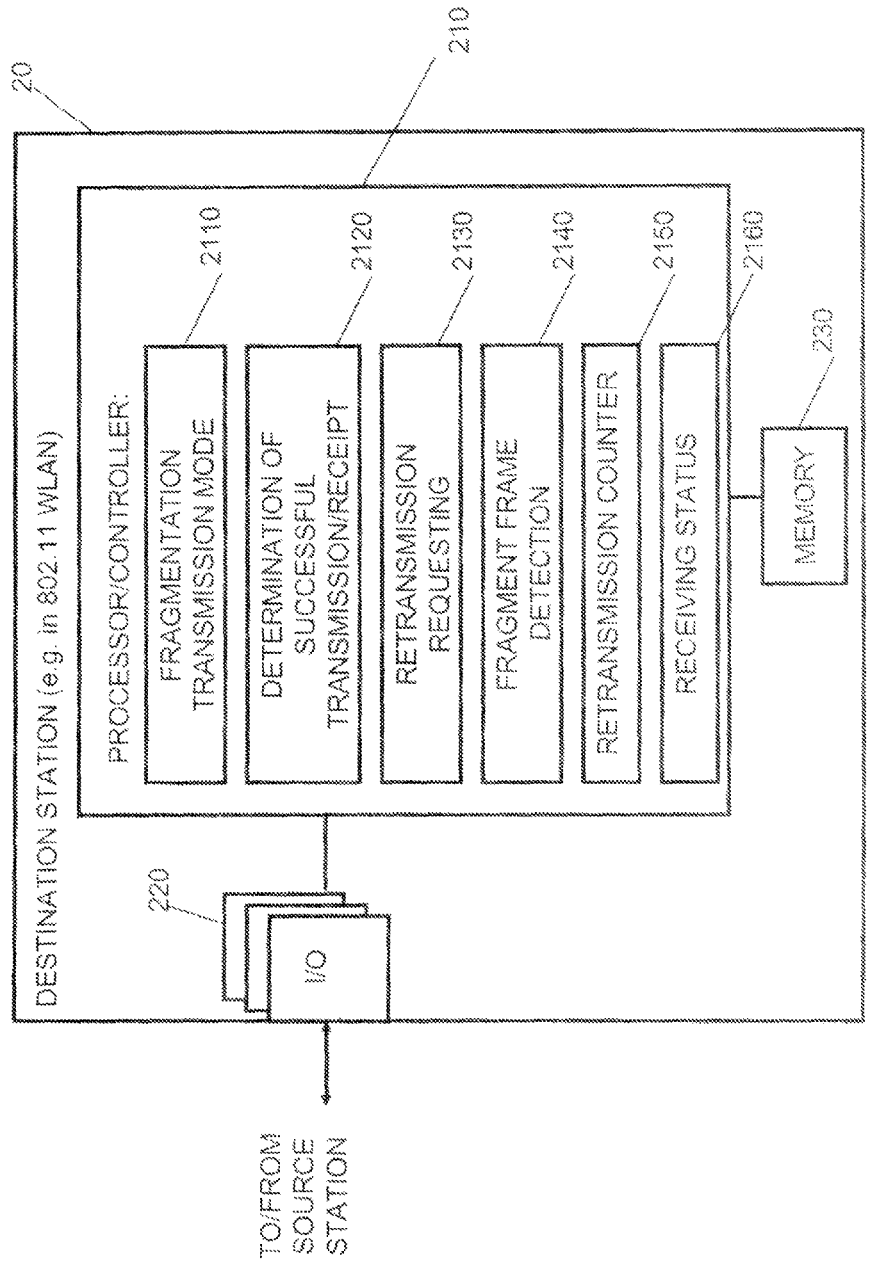
FIG. 6 shows a block circuit diagram of a destination station including processing portions conducting functions according to examples of embodiments of the invention.

FIG. 6 shows a block circuit diagram of a destination station including processing portions conducting functions according to examples of embodiments of the invention. Specifically, in FIG. 6, a block circuit diagram illustrating a configuration of destination station such as network node or device according to a IEEE 802.11 based WLAN device is shown, which is configured to implement functions for a processing as described in connection with the examples of embodiments of the invention according to FIG. 4.

It is to be noted that the destination station 20 shown in FIG. 6 may comprise several further elements or functions besides those described herein below, which are omitted herein for the sake of simplicity as they are not essential for understanding the invention. Furthermore, even though reference is made to a network node or the like, the source station may be also another device having a similar function, such as a modem chipset, a chip, a module etc., which can also be part of a communication network element or attached as a separate element to a communication network element, or the like. Moreover, it is to be noted that a network element according to examples of embodiments of the invention does not need to comprise all of the processing portions described below, as long as the main functionality regarding the transmission control in fragmentation transmission mode as described above can be executed.

The destination station 20 may comprise a processing function or processor 210, such as a CPU or the like, which executes instructions given by programs or the like related the transmission control. The processor 210 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 220 denotes interface or transceiver or input/output (I/O) units connected to the processor 210. The I/O units 220 may be used for communicating with elements of the communication network, such as a source station. The I/O units 220 may be a combined unit comprising communication equipment towards several network elements, or may comprise a distributed structure with a plurality of different interfaces for different network elements. Reference sign 230 denotes a memory usable, for example, for storing data and programs to be executed by the processor 210 and/or as a working storage of the processor 210.

The processor 210 is configured to execute processing related to the above described transmission control mechanism. In particular, the processor 210 comprises a sub-portion 2110 as a processing portion which is usable as a controller for the fragmentation transmission mode. Furthermore, the processor 210 comprises a sub-portion 2120 as a processing portion which is usable for determining whether a fragment frame is successfully received. Furthermore, the processor 210 may comprise a sub-portion 2130 as a processing portion which is usable for requesting the retransmission of the unsuccessfully transmitted fragment frame. Moreover, the processor 210 may comprise a sub-portion 2140 as a processing portion which is usable for detecting whether the fragment frame in question is the last (only) frame of the transmission. In addition, the processor 210 may comprise a sub-portion 2150 as a processing portion which is usable as a retransmission counter. Furthermore, the processor 210 may comprise a sub-portion 2160 as a processing portion which is usable for distinguishing the receiving status of information, i.e. the above defined first status and second status.

As indicated above, the source station 10 may also comprise elements of the destination station 20, and vice versa, as both stations may change their roles in the communication network.

In the following, examples of embodiments of the invention are described in which the above described mechanism and/or methods and/or devices are implemented. It is to be noted that in the described embodiment reference is made to a WLAN based system, but the principles of embodiments of the invention are applicable also in other network system using a fragmentation transmission scheme or the like.

In comparison to the examples described in connection with FIGS. 9 to 11, in FIGS. 7 and 8, examples of embodiments of the invention are described where both STAs, i.e. the SRC and the DST are controlled such that the fragment transmission mode is maintained or resumed, instead of ceasing the transmission and releasing the channel. Thus, entering the channel congestion stage can be avoided.

Figure 7:
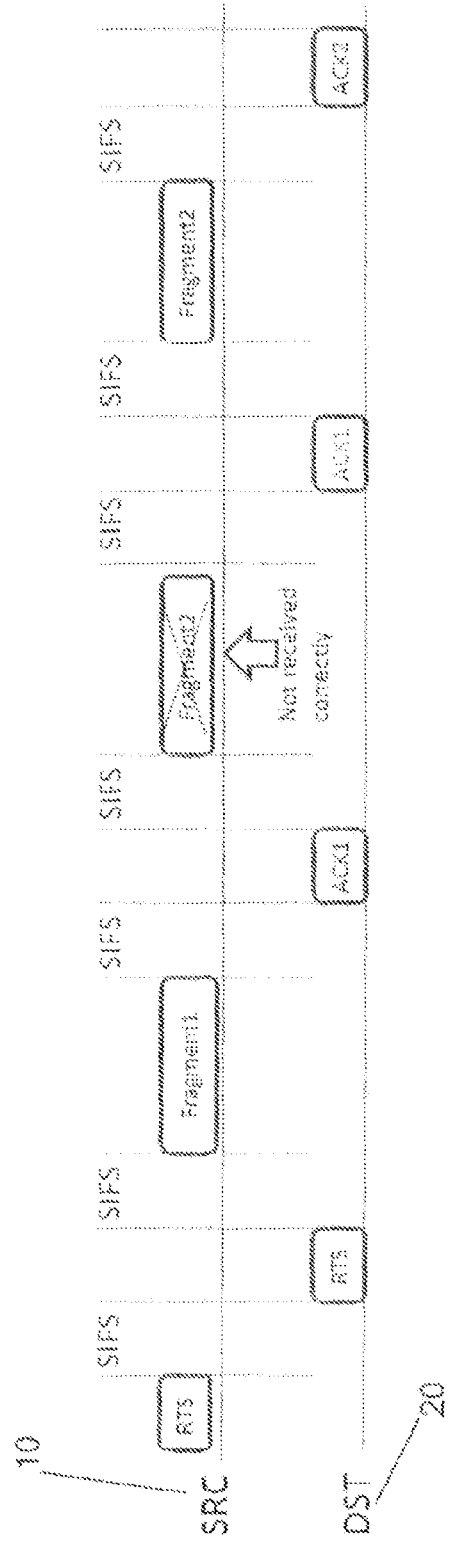
FIG. 7 shows a diagram illustrating a data transmission controlled according to an example of embodiments of the invention.

Specifically, in FIG. 7, a diagram is shown illustrating a data transmission controlled according to an example of embodiments of the invention. The fragmentation transmission mode according to FIG. 7 is assumed to be combined with RTS/CTS transmission, wherein the data transmission is conducted between a source station SRC 10 and a destination station DST 20. In FIG. 7, the upper line indicates the transmission processing in the source station, i.e. the transmission of fragments (here indicated by fragments 1 and 2), and the lower line indicates the transmission processing in the destination station, i.e. mainly the transmissions of ACKs following to the receipt of a respective fragment. Furthermore, the respective waiting times SIFS are indicated. It is to be noted that a reservation of channel resources by means of NAVs or the like is not separately indicated.

At the beginning of the connection, i.e. at the beginning of the transmission of a data packet being divided or fragmented in plural fragments (in the present example three or more fragments are assumed in a consecutive order with fragment 1 being the first one), the source STA SRC 10 sends a RTS to the destination STA DST 20 after it seizes the channel (e.g. by a NAV, as described in connection with FIG. 9). In the RTS message, the SRC 10 may reserve the channel, for example, until the first expected ACK (here, ACK1).

Then, when receiving the RTS successfully, the destination STA DST 20 replies a CTS to the source STA SRC 10. Otherwise, the DST 20 keeps silent and the connection is terminated. In the CTS message, the destination STA DST 20 reserves the channel (e.g. by a NAV, as described in connection with FIG. 9) until the first expected ACK (again ACK 1).

A successful transmission of a fragment is described in connection with fragment 1. In case the SRC 10 receives the CTS successfully, it transmits the fragment (i.e. fragment 1) to the DST 20 after waiting one SIFS time period. Otherwise, in the case of the RTS/CTS procedure, the SRC 10 may go back to an initial connection establishment state, for example the channel contention stage, in order to send another RTS.

It is to be noted that in another example, in case the current fragment to be transmitted is the only fragment, the source STA SRC 10 reserves the channel until the expected incoming ACK (ACK1). Otherwise, as in the present example where there are further fragments to be transmitted, the SRC 10 reserves the channel until the next expected ACK (i.e. ACK2 for the following fragment).

In case the destination STA DST 20 receives the fragment correctly, it replies an ACK (here, ACK1) to the source station SRC 10 after one SIFS time period.

It is to be noted that in case there is no more fragment to be received, e.g. because the current fragment is the only fragment in the transmission chain or the last fragment of the chain, i.e. the consecutive order of fragments (no further fragment frame follows), the destination STA DST 20 will not reserve the channel and send only the ACK message. Otherwise, in case it is known that there are further fragments to be transmitted (which may be known by a corresponding signaling from the SRC 10), the DST 20 reserves the channel until the next expected ACK (i.e. ACK2).

Back to the SRC 10 side, in case the SRC 10 receives an ACK successfully, it continues sending the fragments according to the fragment number in the ACK information after one SIFS, i.e. it continues with the next fragment in the consecutive order.

According to the present example of an embodiment of the invention, in case a fragment frame is not received successfully by the DST 20, which is indicated in FIG. 7 as occurring in connection with fragment 2 which is to be sent after receiving the ACK1 for the (preceding) successfully completed transmission of fragment 1 and a corresponding waiting time according to a SIFS period destination, the destination STA DST 20 replies to the SRC 10 an indication to retransmit the not successfully received fragment, e.g. with another ACK message. For example, according to the present example, the DST 20 sends the preceding ACK message for a fragment being received successfully, i.e. with the older fragment number of the successfully received fragment after one SIFS, i.e. ACK1. Furthermore, resources are reserved by the DST 20, e.g. by setting the NAV field in the ACK message to the value of the former ACK message, which is now used for retransmitting the lost (i.e. not correctly received) fragment.

In other words, the destination STA DST 20 tries to inform the source STA SRC 10 to start the retransmission of the lost fragment immediately and without entering the initial connection establishment state such as a channel contention stage. As the next frame from the source STA SRC 10 must be a retransmitted frame, the destination STA DST is able to reserve the channel using the old NAV information. In the example shown in FIG. 7, as fragment 2 is assumed to be lost, the destination STA DST 20 knows from the previous fragment frame that it should receive a fragment during the past period, i.e. fragment 2. As this is not the case, the DST 20 is able to still reply an ACK1 (instead of ACK2). When the source STA SRC receives the (old) ACK1, it is able to retransmit fragment 2 immediately, e.g. by simply following the logic regarding the next fragment in the consecutive order according to the indication given in the ACK1.

It is to be noted that according to examples of embodiments of the invention, the destination STA DST 20 is able to automatically reply an ACK since it knows that the fragmentation transmission mode is enabled from the previous received frames.

When the fragment 2 is transmitted successfully, e.g. in the retransmission try, the DST 20 may answer with the ACK2, as usual.

Then, SRC 10 and DST 20 may repeat the above steps until all fragment frames are sent, or until one of them quits the transmission.

According to a further example of an embodiment, in the procedure according to FIG. 7, in order to avoid endless retransmission attempts, a retransmission counter may be implemented. The destination STA DST is configured to stop resuming the transmission, i.e. to send the older ACK, for example, in case a counter value is reduced to zero, or the like. The counter value's maximum amount of retransmissions may be a fixed value, a value settable by an operator, or an adaptively set value, for example as a function of a prevailing network state such as a load situation in the system etc.

According to a still further example of embodiments of the invention, in the procedure according to FIG. 7, a further function may be implemented considering which sort of receiving state is present. That is, for example, it could be distinguished whether the fragment frame being not successfully received is not received at all, i.e. nothing of relevance is received in the period where fragment 2 should have been received (referred e.g. as status 1), or fragment frame 2 is not completely received (broken frame) (referred e.g. as status 2). This function could be provided, for example, by hardware, e.g. in form of signal energy detection and threshold comparison using a CCA indicator etc. Depending on which receiving status is determined, the DST 20 may perform e.g. ACK replying when it receives a broken frame while keeping silent when it receives nothing.

Figure 8:
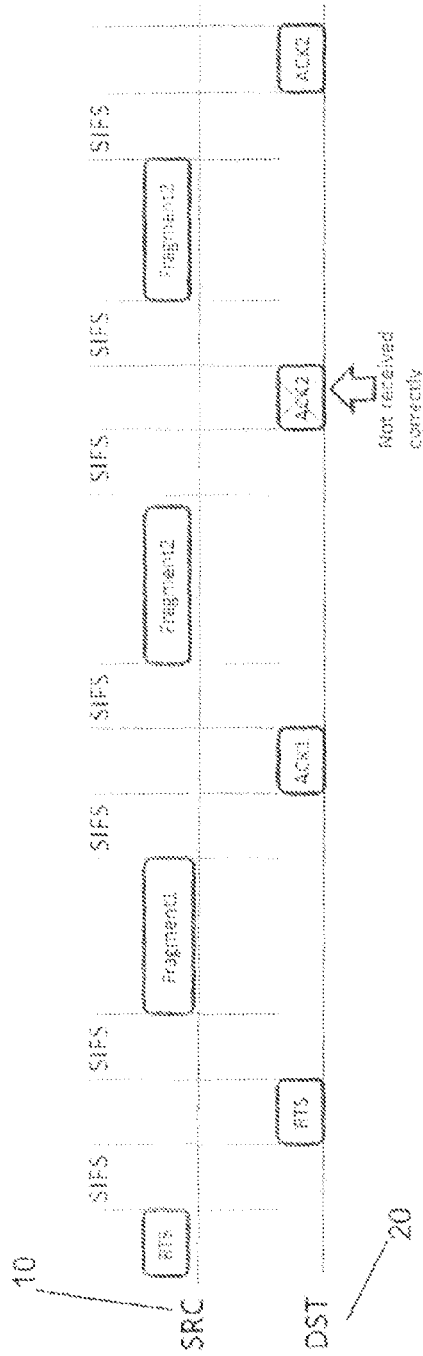
FIG. 8 shows a diagram illustrating a data transmission controlled according to an example of embodiments of the invention.

In FIG. 8, a diagram is shown illustrating a data transmission controlled according to another example of an embodiment of the invention. Like the example in FIG. 7, the fragmentation transmission mode according to FIG. 8 is assumed to be combined with RTS/CTS transmission, wherein the data transmission is conducted between the source station SRC 10 and the destination station DST 20. Again, also in FIG. 8, the upper line indicates the transmission processing in the source station, i.e. the transmission of fragments (here indicated by fragments 1 and 2), and the lower line indicates the transmission processing in the destination station, i.e. mainly the transmissions of ACKs following to the receipt of a respective fragment. Furthermore, the respective waiting times SIFS are indicated. It is to be noted that a reservation of channel resources by means of NAVs or the like is not separately indicated.

At the beginning of the connection, RTS, CTS, fragment frame 1 and ACK 1 are transmitted as in the example of FIG. 7. That is, at the beginning of the transmission of a data packet being divided or fragmented in plural fragments (in the present example three or more fragments are assumed in a consecutive order with fragment 1 being the first one), the source STA SRC 10 sends a RTS to the destination STA DST 20 after it seizes the channel (e.g. by a NAV, as described in connection with FIG. 9). In the RTS message, the SRC 10 may reserve the channel, for example, until the first expected ACK (here, ACK1).

Then, when receiving the RTS successfully, the destination STA DST 20 replies a CTS to the source STA SRC 10.

Otherwise, the DST 20 keeps silent and the connection is terminated. In the CTS message, the destination STA DST 20 reserves the channel (e.g. by a NAV, as described in connection with FIG. 9) until the first expected ACK (again ACK 1).

A successful transmission of a fragment is described in connection with fragment 1. In case the SRC 10 receives the CTS successfully, it transmits the fragment (i.e. fragment 1) to the DST 20 after waiting one SIFS time period. Otherwise, in the case of the RTS/CTS procedure, the SRC 10 may go back to an initial connection establishment state, for example the channel contention stage, in order to send another RTS.

It is to be noted that in a further example, in case the current fragment to be transmitted is the only fragment, the source STA SRC 10 reserves the channel until the expected incoming ACK (ACK1). Otherwise, as in the present example where there are further fragments to be transmitted, the SRC 10 reserves the channel until the next expected ACK (i.e. ACK2 for the following fragment).

In case the destination STA DST 20 receives the fragment correctly, it replies an ACK (here, ACK1) to the source station SRC 10 after one SIFS time period.

It is to be noted that in case there is no more fragment to be received, e.g. because the current fragment is the only fragment in the transmission chain or the last fragment of the chain, i.e. the consecutive order of fragments (no further fragment frame follows), the destination STA DST 20 does not reserve the channel and sends only the ACK message. Otherwise, in case it is known that there are further fragments to be transmitted (which may be known by a corresponding signaling from the SRC 10), the DST 20 reserves the channel until the next expected ACK (i.e. ACK2).

Back to the SRC 10 side, in case the SRC 10 receives an ACK successfully, it continues sending the fragments according to the fragment number in the ACK information after one SIFS, i.e. it continues with the next fragment in the consecutive order.

According to the present example of an embodiment of the invention, it is assumed that the ACK2 message related to the transmission of fragment 2 is not received correctly at the SRC 10 side, e.g. because the fragment 2 is not received by the DST 20 or the ACK2 message is lost. In this case, after waiting the time in which the ACK2 should have been received, the SRC 10 may retransmit the fragment 2 immediately, i.e. the fragment frame for which an ACK message is not received successfully. This is possible, for example, since it knows that in fragmentation transmission mode being controlled according to examples of the invention, the destination STA DST 20 has to reply an ACK, irrespective of whether the previous fragment (i.e. fragment 2) is received successfully or not.

In other words, in the example according to FIG. 8, while in case the SRC 10 receives an ACK successfully whereupon it continues sending the fragments according to the fragment number in the ACK information after one SIFS, in case the source STA SRC 10 does not receive the ACK correctly, at least the following cases are to be considered.

In case 1, the frame to be retransmitted is the last (no further frame follows) or only fragment. In this case, the destination STA DST may not reserve the channel for the next transmission, no matter whether or not it has sent an ACK. As a consequence, according to the present example, in this case 1, the source STA SRC 10 stops the fragmentation transmission mode and enters the channel contention stage, for example.

In case 2, the fragment frame to be retransmitted is not the last (or only) fragment (i.e. there is at least one further fragment frame that follows). In this case, the source STA SRC 10 is configured to retransmit the fragment frame (here, fragment 2) after one SIFS since the destination STA DST 20 has to reserve the channel for transmission, as indicated above, irrespective of whether or not the DST 20 has received the previous transmission successfully (see also example described in connection with FIG. 7, ACK1 instead of ACK2).

According to a further example of an embodiment, in the procedure according to FIG. 8, in order to avoid endless retransmission attempts, a retransmission counter may be implemented. The source STA SRC 10 may be configured to stop resuming the transmission, i.e. to retransmit the former fragment, for example, in case a counter value is reduced to zero, or the like. The counter value's maximum amount of retransmissions may be a fixed value, a value settable by an operator, or an adaptively set value, for example as a function of a prevailing network state such as a load situation in the system etc.

According to a still further example of embodiments of the invention, in the procedure according to FIG. 8, a further function may be implemented considering which sort of receiving state is present. That is, for example, it could be distinguished whether the ACK being not successfully received is not received at all, i.e. nothing of relevance is received in the period where ACK2 should have been received (referred e.g. as status 1), or ACK2 is not completely received or another indication for retransmission is received (ACK1 as done in the example of FIG. 7) (referred e.g. as status 2). This function could be provided, for example, by hardware, e.g. in form of a CCA indicator etc. Depending on which receiving status is determined, the SRC 10 may perform e.g. fragment retransmission when it receives incomplete ACK or other indication, or keeping silent when it receives nothing.

It is to be noted that the functions according to both examples described in connection with FIGS. 7 and 8 are combinable in both devices acting as a source station or as a destination station.

A modification of the examples of an embodiment is explained in the following which is based on a scheme similar to that shown in the examples according to FIGS. 7 and 8 as described above.

As indicated above, according to the preceding examples described in connection with FIGS. 7 and 8, in case the frame to be retransmitted is the last fragment of the transmission chain, i.e. there is no further fragment frame to be transmitted, the destination STA DST 20 does not reserve the channel for the next transmission and the source STA SRC 10 stops the fragmentation transmission mode and enters the channel contention stage, for example. On the other hand, according to the present modification, the destination STA DST 20 sends a request for retransmission, e.g. in the form of the former ACK (i.e. the ACK message sent for the preceding fragment frame being received correctly, e.g. ACK1) also in case the not correctly received fragment frame is the last fragment of the transmission frame, i.e. irrespective of whether the not successfully received fragment frame is the last fragment or not (i.e. also in case it is determined that the fragment 2 is the last frame of the consecutive order of fragment frames). That is, the channel for the retransmission is reserved by the DST by using the former ACK. On the SRC side, when the SRC receives the (older) ACK (such as ACK1), it is recognized that a channel is reserved by means of the received (older) ACK (e.g. since it is related to a fragment number being already sent and thus recognized as a request for retransmission), so that a retransmission of the fragment which was sent in the preceding period (i.e. fragment 2 which was not received correctly) is initiated, even though the SRC has not reserved the channel in the preceding (not successfully received) transmission (as it has identified that this fragment frame was the last frame in the transmission chain).

Thus, according to the above described modification, a reservation by the DST station requesting retransmission of the preceding frame suffices even if the frame being received not correctly is the last frame of the consecutive order of fragment frames (i.e. no further frame would follow).

According to further examples of embodiments of the invention, procedures as described in connection with FIGS. 7 and 8 are also applicable in transmission schemes working without RTS/CTS. In such cases, a transmission mode may function, for example, by replacing RTS/CTS signaling with the first transmitted fragment frame and its corresponding ACK frame.

Examples of embodiments of the invention may be implemented, for example, as a mandatory or optional mode in existing structures for a fragmentation transmission mode, e.g. according to an enhanced fragmentation mode for 802.11 standards. Furthermore, it is also possible to implement examples of embodiments of the invention without being standardized, as it is possible to cooperate with a conventional fragmentation transmission mode not working with the signaling and functions described above, since any STA equipped with a function as described above is able to resume an interfered fragmentation transmission mode and avoid entering the channel contention stage.

According to further examples of embodiments of the invention, there is provided an apparatus comprising transmitting means for transmitting, in a fragmentation transmission mode, a set of data being divided in a plurality of fragment frames, wherein the fragment frames are transmitted in a consecutive order, receiving means for receiving an acknowledgment message for confirming a successful transmission of the data frames, determining means for determining whether or not an acknowledgment message for confirming the successful transmission of one fragment frame is received before the next fragment frame is transmitted or before the transmission is completed, and retransmission processing means for, in case the determining means determines that the acknowledgment for the successful transmission of the one fragment frame is not received, maintaining the fragmentation transmission mode and for initiating a retransmission of the fragment frame corresponding to that for which the acknowledgement of the successful transmission is not received.

According to still further examples of embodiments of the invention, there is provided an apparatus comprising receiving means for receiving, in a fragmentation transmission mode, a set of data being divided in a plurality of fragment frames, wherein the fragment frames are received in a consecutive order, transmitting means for transmitting an acknowledgment message for confirming a successful transmission of the data frames, receipt determining means for determining whether or not a current fragment frame is successfully transmitted and received, and retransmission requesting means for, in case the receipt determining means determines that the fragment frame is not successfully received, sending a request for retransmission of the fragment frame which is not successfully transmitted and received, wherein the request for retransmission comprises an indication to maintain the fragmentation transmission mode, and for reserving transmission resources for the retransmission of the fragment frame.

According to still further examples of embodiments of the invention, there is provided, according to an aspect A, a method comprising transmitting, in a fragmentation transmission mode, a set of data being divided in a plurality of fragment frames, wherein the fragment frames are transmitted in a consecutive order, determining whether or not an acknowledgment message for confirming a successful transmission of one fragment frame is received before the next fragment frame is transmitted or before the transmission is completed, and in case it is determined that the acknowledgment for the successful transmission of the one fragment frame is not received, maintaining the fragmentation transmission mode and initiating a retransmission of the fragment frame corresponding to that for which the acknowledgement of the successful transmission is not received.

According to an aspect A1, the method according to aspect A further comprises detecting whether or not at least one further fragment frame exists in the consecutive order after the one fragment frame for which the acknowledgment for the successful transmission is not received, wherein the fragmentation transmission mode is maintained and the retransmission of the fragment frame corresponding to that for which the acknowledgement of the successful transmission is not received is initiated in case the detecting results in that at least one further fragment frame exists in the consecutive order.

According to an aspect A2, in the method according to aspect A or A1, the determining of whether or not the acknowledgment message for confirming the successful transmission of a current fragment frame is received further comprises at least one of determining that a corresponding acknowledgment message is not received within a predetermined period of time after the transmission of the current fragment frame, and determining that an indication is received to start a retransmission of a fragment frame which is not successfully transmitted.

According to an aspect A3, in the method according aspect A2, the indication to start a retransmission of a fragment frame which is not successfully transmitted is received as an acknowledgment message for a successful transmission of a preceding fragment frame being transmitted before the current fragment frame, wherein the message is received within a predetermined period of time after the transmission of the current fragment frame.

According to an aspect A4, the method according to any of aspects A to A3 further comprises determining whether a number of retransmission attempts being initiated reaches a preset maximum number, and stopping the initiation of retransmitting the fragment frame corresponding to that for which the acknowledgement of the successful transmission is not received when the maximum number is reached.

According to an aspect A5, the method according aspect A4 further comprises setting the maximum number adaptively according a function of prevailing communication network state.

According to an aspect A6, the method according to any of aspects A to A5 further comprises distinguishing a receiving status of information, on the basis of which it is determined whether or not the acknowledgment message for confirming the successful transmission of one fragment frame is received, into a first status where no acknowledgement message is received and a second status where at least one of an incomplete acknowledgement message or an indication to start a retransmission of a fragment frame is received, stopping the initiation of a retransmission of the fragment frame in the first status, and allowing the initiation of a retransmission of the fragment frame in the second status.

According to an aspect A7, the method according to any of aspects A to A6 further comprises transmitting, in the fragmentation transmission mode, an indication with one of the fragment frames that at least one further fragment frame in the consecutive order follows.

According to an aspect A8, the method according to any of aspects A to A7 is implemented in a source station communicating in a wireless local area network.

According to still further examples of embodiments of the invention, there is provided, according to an aspect B, a method comprising determining whether or not, in a fragmentation transmission mode, a fragment frame of a set of data being divided in a plurality of fragment frames, wherein the fragment frames are received in a consecutive order, is successfully transmitted and received, in case it is determined that the fragment frame is not successfully received, sending a request for retransmission of the fragment frame which is not successfully transmitted and received, wherein the request for retransmission comprises an indication to maintain the fragmentation transmission mode, and reserving transmission resources for the retransmission of the fragment frame.

According to an aspect B1, the method according to aspect B further comprises detecting whether or not at least one further fragment frame is to be received in the consecutive order after the one fragment frame being not successfully received, wherein in case it is detected that at least one further fragment frame exists in the consecutive order, the request for retransmission of the fragment frame is sent and the transmission resources are reserved.

According to an aspect B2, in the method according to aspect B or B1, the determining of whether or not the fragment frame is successfully transmitted and received further comprises determining that the fragment frame is not received within a predetermined period of time after a transmission of an acknowledgment message for a preceding fragment frame.

According to an aspect B3, in the method according to any of aspects B to B2, the request for retransmission comprises an indication to start a retransmission of a fragment frame which is not successfully transmitted in the form of a preceding acknowledgment message for a successful transmission and receipt of a preceding fragment frame being transmitted and received before the current fragment frame.

According to an aspect B4, the method according to any of aspects B to B3, further comprises determining whether a number of requests for retransmission sent reaches a preset maximum number, and stopping sending of a request for retransmission of the fragment frame which is not successfully received when the maximum number is reached.

According to an aspect B5, in the method according to aspect B4, the maximum number is adaptively set according a function of prevailing communication network state.

According to an aspect B6, the method according to any of aspects B to B5 further comprises distinguishing a receiving status of information, on the basis of which it is determined whether or not the fragment frame is successfully transmitted and received, into a first status where no fragment frame is received and a second status where an incomplete fragment frame is received, stopping sending of the request for retransmission of the fragment frame in the first status, and allowing sending of the request for retransmission of the fragment frame in the second status.

According to an aspect B7, the method according to any of aspects B to B6 further comprises receiving, in the fragmentation transmission mode, an indication with one of the fragment frames that at least one further fragment frame in the consecutive order follows.

According to an aspect B8, the method according to any of aspects B to B7 is implemented in a destination station communicating in a wireless local area network.

In addition, according to examples of embodiments of the present invention, according to an aspect C, a computer program product for a computer, comprising software code portions for performing the steps of the above defined methods according to any of aspects A to A8 or B to B8, when said product is run on the computer. The computer program product according to aspect C may further comprise a computer-readable medium on which said software code portions are stored. Furthermore, the computer program product may be directly loadable into the internal memory of the computer and/or transmittable via a network by means of at least one of upload, download and push procedures.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for controlling a transmission of data in a fragmentation transmission mode. When fragments are transmitted in a fragmentation transmission mode, it is determined whether the fragment frame is received successfully or whether an acknowledgment message for confirming a successful transmission of the fragment frame is received. In case the acknowledgment for the successful transmission of the one fragment frame is not received, or the fragment is frame is not successfully received, the fragmentation transmission mode is maintained and a retransmission of the fragment frame is initiated.

Although the present invention has been described herein before with reference to particular embodiments thereof, the present invention is not limited thereto and various modifications can be made thereto.

The invention claimed is:

1. An apparatus comprising
a transmitter configured to transmit, in a fragmentation transmission mode, a set of data being divided in a plurality of fragment frames, wherein the fragment frames are transmitted in a consecutive order,
a receiver configured to receive an acknowledgment message for confirming a successful transmission of the data frames,
a determiner configured to determine whether or not an acknowledgment message for confirming the successful transmission of one fragment frame is received before the next fragment frame is transmitted or before the transmission is completed,
a retransmission processing portion configured, in case the determiner determines that the acknowledgment for the successful transmission of the one fragment frame is not received, to maintain the fragmentation transmission mode and to initiate a retransmission of the fragment frame corresponding to that for which the acknowledgement of the successful transmission is not received, and
a distinguisher configured to distinguish a receiving status of information, on the basis of which the determiner determines whether or not the acknowledgment message for confirming the successful transmission of one fragment frame is received, into a first status where no acknowledgement message is received and a second status where at least one of an incomplete acknowledgement message or an indication to start a retransmission of a fragment frame is received,
wherein the distinguisher is further configured to stop the retransmission processing portion from initiating a retransmission the fragment frame in the first status, and to allow the retransmission processing portion to initiate a retransmission the fragment frame in the second status.

2. The apparatus according to claim 1, further comprising
a detector configured to detect whether or not at least one further fragment frame exists in the consecutive order after the one fragment frame for which the acknowledgment for the successful transmission is not received,
wherein the retransmission processing portion is further configured to maintain the fragmentation transmission mode and to initiate the retransmission of the fragment frame corresponding to that for which the acknowledgement of the successful transmission is not received in case the detector detects that at least one further fragment frame exists in the consecutive order.

3. The apparatus according to claim 1, wherein the determiner is configured to determine whether or not the acknowledgment message for confirming the successful transmission of a current fragment frame is received by at least one of
determining that the receiver has not received a corresponding acknowledgment message within a predetermined period of time after the transmission of the current fragment frame, and
determining that an indication is received to start a retransmission of a fragment frame which is not successfully transmitted.

4. The apparatus according to claim 3, wherein the indication to start a retransmission of a fragment frame which is not successfully transmitted is received by the receiver as an acknowledgment message for a successful transmission of a preceding fragment frame being transmitted before the current fragment frame, wherein the message is received within a predetermined period of time after the transmission of the current fragment frame.

5. The apparatus according to claim 1, further comprising
a retransmission counter configured to determine whether a number of retransmission attempts initiated by the retransmission processing portion reaches a preset maximum number and to stop the retransmission processing portion from initiating a retransmission the fragment frame corresponding to that for which the acknowledgement of the successful transmission is not received when the maximum number is reached.

6. The apparatus according to claim 5, wherein the maximum number is adaptively set according to a function of a prevailing communication network state.

7. The apparatus according to claim 1, wherein the transmitter is further configured to transmit, in the fragmentation transmission mode, an indication with one of the fragment frames that at least one further fragment frame in the consecutive order follows.

8. The apparatus according to claim 1, wherein the apparatus is comprised in a source station communicating in a wireless local area network.

9. A method comprising
transmitting, in a fragmentation transmission mode, a set of data being divided in a plurality of fragment frames, wherein the fragment frames are transmitted in a consecutive order,
determining whether or not an acknowledgment message for confirming a successful transmission of one fragment frame is received before the next fragment frame is transmitted or before the transmission is completed, and
in case it is determined that the acknowledgment for the successful transmission of the one fragment frame is not received, maintaining the fragmentation transmission mode and initiating a retransmission of the fragment frame corresponding to that for which the acknowledgement of the successful transmission is not received, based on whether the fragment frame is the last fragment in the consecutive order.

10. An apparatus comprising
a receiver configured to receive, in a fragmentation transmission mode, a set of data being divided in a plurality of fragment frames, wherein the fragment frames are received in a consecutive order,
a transmitter configured to transmit an acknowledgment message for confirming a successful transmission of the data frames,
a receipt determiner configured to determine whether or not a current fragment frame is successfully transmitted and received, and
a retransmission requesting portion configured, in case the receipt determiner determines that the fragment frame is not successfully received, to send a request for retransmission of the fragment frame which is not successfully transmitted and received, wherein the request for retransmission comprises an indication to maintain the fragmentation transmission mode, and to reserve transmission resources for the retransmission of the fragment frame, based on whether the fragment frame is the last fragment in the consecutive order.

11. The apparatus according to claim 10, further comprising a detector configured to detect whether or not at least one further fragment frame is to be received in the consecutive order after the one fragment frame being not successfully received, wherein the retransmission requesting portion is further configured to send the request for retransmission of the fragment frame and to reserve the transmission resources in case the detector detects that at least one further fragment frame exists in the consecutive order.

12. The apparatus according to claim 10, wherein the receipt determiner is configured to determine whether or not the fragment frame is successfully transmitted and received by determining that the receiver has not received the fragment frame within a predetermined period of time after a transmission of an acknowledgment message for a preceding fragment frame.

13. The apparatus according to claim 10, wherein the request for retransmission comprises an indication to start a retransmission of a fragment frame which is not successfully transmitted in the form of a preceding acknowledgment message for a successful transmission and receipt of a preceding fragment frame being transmitted and received before the current fragment frame.

14. The apparatus according to claim 10, further comprising
a retransmission counter configured to determine whether a number of requests for retransmission sent by the retransmission requesting portion reaches a preset maximum number, and to stop the retransmission requesting portion from sending a request for retransmission of the fragment frame which is not successfully received when the maximum number is reached.

15. The apparatus according to claim 14, wherein the maximum number is adaptively set according to a function of a prevailing communication network state.

16. The apparatus according to claim 10, further comprising
a distinguisher configured to distinguish a receiving status of information, on the basis of which the receipt determiner determines whether or not the fragment frame is successfully transmitted and received, into a first status where no fragment frame is received and a second status where an incomplete fragment frame is received,
wherein the distinguisher is further configured to stop the retransmission requesting portion from sending the request for retransmission of the fragment frame in the first status, and to allow the retransmission requesting portion to send the request for retransmission of the fragment frame in the second status.

17. The apparatus according to claim 10, wherein the receiver is further configured to receive, in the fragmentation transmission mode, an indication with one of the fragment frames that at least one further fragment frame in the consecutive order follows.

18. The apparatus according to claim 10, wherein the apparatus is comprised in a destination station communicating in a wireless local area network.

* * * * *

UNITED STATES PATENT AND TRADEMARK OFFICE
CERTIFICATE OF CORRECTION

PATENT NO. : 8,718,083 B2  
APPLICATION NO. : 13/315923  
DATED : May 6, 2014  
INVENTOR(S) : Wei Li et al.

Page 1 of 1

It is certified that error appears in the above-identified patent and that said Letters Patent is hereby corrected as shown below:

On the Title Page

Item (75), please correct the spelling of the fourth listed inventor's city by replacing "Li" with --Ii--.

Signed and Sealed this  
Fifth Day of August, 2014

Michelle K. Lee  
*Deputy Director of the United States Patent and Trademark Office*